United States Patent [19]

Weber et al.

[11] Patent Number: 5,446,094
[45] Date of Patent: Aug. 29, 1995

[54] THERMOPLASTIC COUPLING AGENT MIXTURE

[75] Inventors: Martin Weber, Neustadt; Friedrich Seitz, Friedelsheim; Andreas Jung, Mannheim; Norbert Guentherberg, Speyer, all of Germany

[73] Assignee: BASF Aktiengesellschaft, Ludwigshafen, Germany

[21] Appl. No.: 107,373

[22] Filed: Aug. 17, 1993

[30] Foreign Application Priority Data

Aug. 21, 1992 [DE] Germany ............ 42 27 742.6

[51] Int. Cl.$^6$ ............ C08L 33/00; C08L 53/00
[52] U.S. Cl. ............ 525/93; 525/98; 525/221; 525/207; 525/205; 525/222; 525/227
[58] Field of Search ............ 525/93, 98, 221, 207, 525/205, 71, 78, 80, 222, 227

[56] References Cited

U.S. PATENT DOCUMENTS

| | | | |
|---|---|---|---|
| 3,562,356 | 2/1971 | Nyberg et al. | 525/93 |
| 3,639,517 | 2/1972 | Kitchen et al. | 525/93 |
| 3,792,124 | 2/1974 | Davison et al. | 525/93 |
| 3,998,907 | 12/1976 | DiGiolio | 525/205 |
| 4,426,495 | 1/1984 | Vitos et al. | 525/93 |
| 4,444,952 | 4/1984 | Feinberg et al. | 525/93 |
| 4,444,953 | 4/1984 | St. Clair | 525/93 |
| 4,562,222 | 12/1985 | Liu | 525/93 |
| 4,734,456 | 3/1988 | Motomatsu et al. | 525/207 |
| 5,162,435 | 11/1992 | Shibuya et al. | 525/80 |

FOREIGN PATENT DOCUMENTS

| | | |
|---|---|---|
| 0287140 | 10/1988 | European Pat. Off. . |
| 527390 | 2/1993 | European Pat. Off. . |
| 9000579 | 1/1990 | WIPO . |

*Primary Examiner*—James J. Seidleck
*Assistant Examiner*—M. L. Warzel
*Attorney, Agent, or Firm*—Keil & Weinkauf

[57] ABSTRACT

A thermoplastic coupling agent mixture (A) containing
a) 5 to 95% by weight of an ethylene copolymer ($A_I$) having minor amounts of polar comonomers, and
b) 5 to 95% by weight of a copolymer ($A_{II}$) of aromatic monovinyl comonomers and conjugated dienes is suitable in particular as a component in thermoplastic polymer mixtures that contain polyolefins (B), copolymers of styrene (C), and also if appropriate further thermoplastic polymers (D), and the components (B), (C) and if appropriate (D) may also be used in the form of reprocessed polymers obtainable by regranulating molded parts produced from the relevant materials.

6 Claims, No Drawings

THERMOPLASTIC COUPLING AGENT MIXTURE

The present invention relates to a thermoplastic coupling agent mixture containing
a) 5 to 95% by weight of an ethylene copolymer ($A_I$) having minor amounts of polar comonomers, and
b) 5 to 95% by weight of a copolymer ($A_{II}$) of aromatic monovinyl comonomers and conjugated dienes.

The present invention also relates to a thermoplastic polymer mixture obtainable from the thermoplastic coupling agent mixtures, to processes for preparing such mixtures, and also to their use for producing fibers, molded parts and molded articles.

Polyolefins have, inter alia, a good chemical resistance and low moisture absorption. On account of their favorable cost and good recyclability, polyolefins are also increasingly used as construction materials, for example in automobile manufacture. However, for some applications the relatively low rigidity and impact strength of the polyolefins is problematical, and furthermore the shrinkage that occurs during injection molding processing of polyolefins is also a problem.

The aforementioned disadvantages of the polyolefins could be overcome by adding styrene copolymers, preferably rubber-modified styrene copolymers, for example ABS (acrylonitrile-butadiene-styrene polymers) and ASA (acrylonitrile-styrene-acrylate polymers), since the aforementioned styrene copolymers have in particular a good rigidity and toughness and also a low shrinkage.

Polymer mixtures, ie. blends of polyolefins and styrene copolymers, are however two-phase systems on account of their thermodynamic incompatibility and also have very poor mechanical properties. The literature accordingly contains a number of suggestions for improving the properties of blends of polyolefins and styrene copolymers.

For example, DE-A 40 20 603 describes a resin prepared from a polyolefin modified with acidic groups and a styrene copolymer, and which comprises at least one hydroxyl-containing vinyl monomer, at least one vinyl-aromatic monomer, and at least one cyano-containing vinyl monomer. In blends of polypropylene and terpolymers of acrylonitrile, butadiene and styrene, which are termed ABS polymers, this resin leads to a reduction in the size of the dispersed particles and to an increase in the Izod impact strength. However, the preparation of such styrene copolymers is relatively complicated since these are built up from several hydroxyl-containing and cyano-containing polymers.

The use of styrene-diene copolymers as coupling agents for blends of polyolefins and styrene copolymers is described in a number of patents, for example WO-A 90/0579, EP-A 42 153. The styrene-ethylene-propylene-butylene copolymers obtainable from styrene-diene copolymers by hydrogenation can also be employed for this purpose.

It is also known from Patent BE-B 806 707 that ethylene-vinyl acetate copolymers are suitable as coupling agents for blends of polyolefins and styrene copolymers.

An improvement in the mechanical properties of mixtures of polypropylene and styrene copolymers is also said to be possible by adding chlorinated polyolefins (JP-A 54/087 746).

Furthermore, EP-A 287 140 discloses polymer compositions of ethylene-propylene-diene rubbers, ethylene-vinyl acetate copolymers and ethylene-1-alkene copolymers which are suitable as coupling agents in styrene copolymer/polyolefin blends.

It is an object of the present invention to obviate the aforementioned disadvantages and to develop a novel coupling agent that can be prepared by a relatively uncomplicated process and that is suitable in particular as a coupling agent for blends of polyolefins and styrene copolymers. The object of the invention also extends to the polymer mixtures obtainable from these coupling agents and to processes for their preparation.

We have found that this object is achieved by a thermoplastic coupling agent mixture (A) containing
a) 5 to 95% by weight of an ethylene copolymer ($A_I$) having minor amounts of polar comonomers, and
b) 5 to 95% by weight of a copolymer ($A_{II}$) of aromatic monovinyl comonomers and conjugated dienes.

Preferably, a thermoplastic coupling agent mixture (A) is used that contains 10 to 90% by weight, in particular 15 to 85% by weight, of an ethylene copolymer ($A_I$) and 10 to 90% by weight, in particular 15 to 85% by weight, of a copolymer ($A_{II}$).

The ethylene copolymer ($A_I$) contained in the coupling agent mixture according to the invention has minor amounts of polar comonomers. Preferred ethylene copolymers ($A_I$) contain up to 40% by weight of such polar comonomers. Suitable polar comonomers include, inter alia, nitrile-containing and halogen-containing aliphatic vinyl monomers. Preferred polar comonomers of the ethylene copolymer ($A_I$) are $\alpha,\beta$-unsaturated carboxylic acids and carboxylic acid derivatives. These include in particular acrylic acid, methacrylic acid, ethacrylic acid, maleic acid and fumaric acid, and also their esters, acid anhydrides, acid halides and imides. Especially preferred polar comonomers are in particular acrylic acid, methacrylic acid, and also their esters with aliphatic alcohols and their anhydrides. The ethylene copolymers ($A_I$) may furthermore contain up to 10% by weight of $C_3$-$C_8$-1-alkenes incorporated by polymerization, for example propylene, 1-butene, 1-pentene or 1-hexene.

The ethylene copolymers used as component $A_I$ are prepared for example by conventional high-pressure polymerization methods (see Ullmanns Enzyklopädie der technischen Chemie, 4th Edition, Vol. 19, (1980), pages 169 to 175, Verlag Chemie GmbH, W-6940 Weinheim). The copolymerization of the ethylene with the polar comonomers, in particular the $\alpha,\beta$-unsaturated carboxylic acids or carboxylic acid derivatives, is carried out at pressures of from 350 to 5000 bar, preferably 1500 to 3000 bar. The preparation of the ethylene copolymers is carried out in particular at pressures from 2000 to 2800 bar. The temperatures in the polymerization system are generally from 50° to 450° C., preferably from 150° to 350° C. Further details of the preparation of the ethylene copolymers used and also a list of suitable comonomers are given for example in EP-A 131 707.

The copolymers ($A_{II}$) contained in the thermoplastic coupling agent mixture (A) according to the invention are copolymers of aromatic monovinyl monomers, for example styrene or e-methyl styrene and also conjugated dienes. A particularly suitable aromatic monovinyl comonomer is styrene. The conjugated dienes used are inter alia butadiene or isoprene, butadiene being particularly preferred. Other copolymers ($A_{II}$) which may be used are copolymers obtainable by first of all polymerizing aromatic monovinyl comonomers with conjugated dienes and then subjecting the product to a hydrogenation reaction.

Such copolymers ($A_{II}$) can be obtained in particular by anionic polymerization of aromatic monovinyl comonomers and conjugated dienes, mainly giving block copolymers of these comonomers. Methods for preparing such copolymers ($A_{II}$) are generally known (U.S. Pat. No. 3,595,942).

The copolymers ($A_{II}$) used may have any desired structure, particular preference being given to blocked copolymers having a three-block structure and also branched, star-shaped structures having a multiblock structure. The synthesis of block copolymers of star-shaped structure from aromatic monovinyl monomers and diene monomers is the subject-matter of DE-A 19 59 922, while the synthesis of block copolymers of star-shape structure involving multiple initiation is the subject-matter of DE 25 50 226 and also U.S. Pat. No. 3,639,517.

suitable monomers and initiators are also disclosed in the aforementioned specifications. Particularly preferred are block copolymers based on styrene as aromatic monovinyl monomer and also butadiene and/or isoprene as conjugated diene monomers.

The proportion of the aromatic monovinyl monomer in the copolymers ($A_{II}$) used is 25 to 95, preferably 40 to 90% by weight.

The thermoplastic coupling agent mixture (A) according to the invention can be obtained by mixing the components ($A_I$) and ($A_{II}$), ie. the ethylene copolymer ($A_I$) and the copolymer ($A_{II}$), in a suitable mixing apparatus at average residence times of the components of from 0.2 to 30 minutes, in particular from 0.3 to 20 minutes, and at from 220° to 290° C. in particular from 230° to 270° C. Suitable mixing apparatus include among others screw extruders, preferably twin-screw extruders, Brabender mills, Banbury mills, and also kneaders. The components are first of all introduced via appropriate feed devices into the mixing apparatus, where they are processed and then re-extruded, cooled, and afterwards comminuted.

The thermoplastic coupling agent mixture (A) obtainable in this way may be used as an essential constituent of a likewise thermoplastic polymer mixture.

The coupling agent mixture (A) may be used, inter alia, as a granules mixture and also after prior homogenization by means of melt compounding. The use of melt-compounded material is preferred.

The likewise novel thermoplastic polymer mixture contains, inter alia,
a) 0.5 to 30% by weight of the thermoplastic coupling agent mixture (A),
b) 5 to 95% by weight of polyolefins (B) and
c) 5 to 95% by weight of copolymers of styrene (C).

The novel polymer mixture preferably contains, inter alia,
a) 1 to 20% by weight of the thermoplastic coupling agent mixture (A),
b) 10 to 75% by weight of polyolefins (B) and
c) 10 to 75% by weight of copolymers of styrene (C).

The polyolefins (B) used are in particular propylene homopolymers, ethylene homopolymers and also propylene-ethylene copolymers. Copolymers of propylene and ethylene containing minor amounts of $C_4$-$C_8$-1-alkenes, for example 1-butene, 1-pentene or 1-hexene, may however also be used.

Suitable propylene polymers and ethylene polymers are known to the person skilled in the art and are described in the literature, and accordingly detailed information on their preparation and composition need not be given here.

Propylene homopolymers and also propylene copolymers are in principle suitable, in particular impact-resistant propylene polymers such as are obtained for example by stepwise polymerization according to methods known per se.

The preparation of propylene copolymers is described for example in DE-A 40 01 157 and DE-A 40 11 160, and also the publications cited there.

The subject-matter of DE-A 40 11 160 is copolymers of propylene with 1-alkenes which are obtained by polymerizing mixtures of propylene and the corresponding 1-alkenes, preferably in the gas phase in the absence of a liquid reaction medium. The partial pressures of propylene and the other 1-alkenes are generally chosen to be within the range from 5:1 to 100:1.

The proportion of units derived from the other 1-alkenes is, in such propylene copolymers, generally from 1 to 30, preferably 2 to 20, and in particular 2 to 10,% by weight. 1-alkenes preferred as comonomers are, inter alia, ethylene and 1-butene.

DE-A 40 01 157 describes propylene-ethylene copolymers that can be obtained by a two-stage process. In this process a propylene homopolymer is prepared in a first stage, and a mixture of ethylene and propylene is then polymerized in a second stage in the presence of the product prepared in the first stage. This process can be varied in a number of ways; for further details, reference is made to DE-A 40 01 157.

With regard to the preparation of such propylene homopolymers, reference is also made in particular to the gas phase polymerization process using supported Ziegler-Natta catalysts as described in US-A 48 57 613.

The corresponding ethylene polymers may be prepared in a similar manner to the propylene polymers, using the same processes. Furthermore, they may also be obtained by polymerization using chromium-containing Phillips catalysts or by high-pressure polymerization.

Such polyolefins are marketed inter alia by BASF Aktiengesellschaft under the tradename Novolen ® for propylene polymers and Lupolen ® for ethylene polymers.

The polyolefins (B) that are used generally have average molecular weights (weight average) of from 10,000 to 500,000 and melt flow indices of from 0 1 to 100 g/10 minutes, preferably from 0.2 to 50 g/10 minutes, in each case measured according to DIN 53 735 at 230° C. and 2.16 kg. The melt flow index corresponds to the amount of polymer that is expressed within 10 minutes from the standard test apparatus according to DIN 53 735 at 230° C. and under a weight of 2.16 kg.

As component (C), the thermoplastic polymer mixtures according to the invention contain 5 to 95, preferably 10 to 75,% by weight of styrene copolymers, in particular impact-modified styrene polymers such as acrylonitrile-butadiene-styrene polymers (ABS) and acrylonitrile-styrene-acrylate polymers (ASA). Such styrene copolymers (C) are known to the person skilled in the art.

ABS or ASA polymers are understood quite generally as mixtures of graft polymers with a "soft" grafting base, whose glass transition temperature ($T_g$) is generally below 10° C. and which contain, grafted onto the base, a sheath of monomers whose polymers have a glass transition temperature of preferably more than 25° C. In addition ABS and ASA polymers generally also contain copolymers from the monomers forming the graft sheath of the graft copolymer. These are termed the hard component.

ABS and ASA polymers essentially differ in the chemical composition of the grafting base. In ASA polymers acrylate rubbers are used, while in ABS polymers diene rubbers, in particular based on butadiene, are used.

The preparation of such copolymers of styrene (C) is described for example in EP-A 062 901 or in DE-A 1 260 135.

The styrene content in these copolymers (C) is preferably in the range from 20 to 90% by weight, in particular in the range from 40 to 70% by weight.

Furthermore, it can be advisable to add further thermoplastic polymers (D) to the thermoplastic polymer mixture according to the invention, in amounts of 0.1 to 40% by weight, in particular 1 to 30% by weight, based on the total amount of the thermoplastic polymer mixture. Thermoplastic polymers (D) that may be used include in particular polyamides, polyesters, polycarbonates, polyacrylates, polymethacrylates or polyoxymethylenes or mixtures of these polymers.

The polyamides that may be used are known per se. Examples of such polyamides include, inter alia, polyhexamethylene adipamide, polyhexamethylene pimelamide, polyhexamethylene suberamide, polyhexamethylene azeleamide, polyhexamethylene sebacamide, polyhexamethylene dodecanedioic acid amide, polyoctamethylene suberamide, polydodecamethylene dodecanedioic acid amide, poly-11-aminoundecanoic acid amide and bis (4-aminocyclohexyl)methanedodecanoic acid amide or the products obtained by ring opening of lactams, for example polycaprolactam or polylaurinlactam. Also suitable are polyamides based on terephthalic or isophthalic acid as acid component and/or trimethylhexamethylenediamine, bis(4-aminocyclohexyl)methane or 2,2-di(4-aminocyclohexyl)propane as diamine component, and also polyamide base resins that have been prepared by copolymerizing two or more of the aforementioned polymers or their components. A copolycondensate of terephthalic acid, isophthalic acid, hexamethylenediamine and caprolactam (PA 6/6 T) may be mentioned by way of example.

Partly crystalline polyamides are preferred, in particular PA 6, PA 66, PA 6/6T, PA 66/6T, (copolycondensate of hexamethylenediamine, adipic acid, caprolactam, terephthalic acid and isophthalic acid) and also PA 46.

These polyamides are prepared in a manner known per se (see for example Encyclopedia of Polymer Science and Engineering, Vol. 11, pages 315 to 489, John Wiley & Sons, Inc. 1988 and in the case of partly aromatic copolyamides with reference to the processes described in EP-A 129 195 and 129 196).

In general the molecular weights of the polyamides are chosen in the range from 8000 to 50000, preferably in the range from 12000 to 30000 (numerical average of the molecular weight).

The ratio of terminal acidic groups to terminal amino groups can be controlled by varying the molar ratio of the starting compounds.

The polyamides of the molding materials according to the invention generally have a relative viscosity $\eta_{rel}$ of from 1.7 to 5.0, measured in a 1% by weight solution in 9.6% by weight sulfuric acid at 25° C. Polyamides having a relative viscosity of from 2.3 to 4.5, in particular 2.5 to 4.0, are preferably used.

Furthermore, polyesters may be used as thermoplastic polymers (D).

In general, polyesters based on aromatic dicarboxylic acids and an aliphatic or aromatic dihydroxy compound are used.

A first group of preferred polyesters are polyalkylene terephthalates having 2 to 10 carbon atoms in the alcohol moiety.

Such polyalkylene terephthalates are known per se and are described in the literature, and contain an aromatic ring in the main chain that is derived from the aromatic dicarboxylic acid. The aromatic ring may also be substituted, for example by halogen such as chlorine and bromine or by $C_1$–$C_8$-alkyl groups such as methyl, ethyl, i- or n-propyl, and n-, i- or t-butyl groups.

These polyalkylene terephthalates may be prepared in a manner known per se by reacting aromatic dicarboxylic acids, their esters or other ester-forming derivatives with aliphatic dihydroxy compounds.

Preferred dicarboxylic acids are naphthalenedicarboxylic acid, terephthalic acid and isophthalic acid or their mixtures. Up to 30 mol %, but preferably not more than 10 mol %, of the aromatic dicarboxylic acids may be replaced by aliphatic or cycloaliphatic dicarboxylic acids such as adipic acid, azelaic acid, sebacic acid, dodecanedioic acids and cyclohexanedicarboxylic acids.

Preferred aliphatic dihydroxy compounds are diols having 2 to 6 carbon atoms, in particular 1,2-ethanediol, 1,4-butanediol, 1,6-hexanediol, 1,4-hexanediol, 1,4-cyclohexanediol and neopentyl glycol or their mixtures.

The relative viscosity of the polyesters is generally in the range from 1.2 to 1.8 (measured in a 0.5% by weight solution in a phenol/o-dichlorobenzene mixture) (weight ratio 1:1 at 25° C.).

A further group of polyesters that may be mentioned are wholly aromatic polyesters derived from aromatic dicarboxylic acids and aromatic dihydroxy compounds.

Suitable aromatic dicarboxylic acids include the compounds already described with regard to the polyalkylene terephthalates. Preference is given to mixtures of 5 to 100 mol % of isophthalic acid and 0 to 95 mol % of terephthalic acid, in particular approximately equivalent mixtures of these two acids.

The aromatic dihydroxy compounds preferably have the following formula I

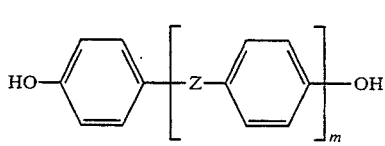

I where Z is an alkylene or cycloalkylene group having up to 8 carbon atoms, an arylene group having up to 12 carbon atoms, a carbonyl group, a sulfonyl group, an oxygen or sulphur atom, or a chemical bond, and in which m has the value 0 or 1. The compounds I may also carry $C_1$–$C_8$-alkyl groups and fluorine, chlorine or bromine as substituents on the phenylene groups.

Mixtures of polyalkylene terephthalates and wholly aromatic polyesters may of course also be used. Such mixtures generally contain 20 to 98% by weight of the polyalkylene terephthalate and 2 to 80% by weight of the wholly aromatic polyester.

Further suitable thermoplastic polymers (D) suitable are polycarbonates, polyacrylates, polymethacrylates or polyoxymethylenes.

Polycarbonates in the context of the present invention are understood to include polycarbonates that can be obtained by polymerizing aromatic dihydroxy compounds, in particular bis(4-hydroxyphenyl)-2,2-propane (Bisphenol A) or its derivatives, for example with phosgene. Corresponding products are known per se and are described in the literature, and most are also available commercially.

Examples of polyacrylates and polymethacrylates include, inter alia, the commercially available polymers of acrylic acid, methacrylic acid, and also their esters. Such polyacrylates and polymethacrylates are prepared in particular by free-radical polymerization of the corresponding monomers. Such preparation methods are known to the person skilled in the art. (Kunststoff-Taschenbuch, H.-J. Saechtling, 22nd Edition, 1983, Carl-Hanser-Verlag, Munich).

Further thermoplastic polymers (D) which may be used are polyoxymethylenes. Polyoxymethylenes that are important in this connection are the respective homopolymers and also the corresponding copolymers with other alkoxy containing comonomers.

Such polymers are known to the person skilled in the art and are described in the literature.

Quite generally, these polymers contain at least 50 mol % of recurring —$CH_2O$-units in the main polymer chain.

The homopolymers are generally prepared by polymerizing formaldehyde or trioxane, preferably in the presence of suitable catalysts.

As well as these constituents A, B and C and also if desired D, the thermoplastic polymer mixtures according to the invention may additionally contain up to 40% by weight, in particular up to 30% by weight, of conventional additives, for example processing auxiliaries, stabilizers, pigments, fillers, flameproofing agents, nucleation agents, lubricants or antioxidants.

The thermoplastic molding materials according to the invention may be prepared according to methods known per se, by mixing the starting components A, B, C and if appropriate D in conventional mixing apparatus such as screw extruders, preferably twin-screw extruders, Brabender mills or Banbury mills as well as kneaders, and then extruding the product. After the extrusion the extrudate is cooled and comminuted.

In order to obtain as homogeneous a molding material as possible, an intensive intermixing is advantageous. For this purpose average residence times of the components of from 0.2 to 30 minutes at from 220 to 290° C. preferably 230° to 270° C., are generally maintained The mixing sequence may be varied, and for example two components may, sometimes be premixed, though of course also all components may be mixed together.

According to a variant of the process, also according to the invention, for preparing the thermoplastic polymer mixture the components (B), (C) and also if necessary (D) may comprise up to 100% by weight, based on the respective proportion in the molding material, of re-processed polymers obtainable by regranulating molded parts produced from the relevant materials.

In particular blends of polyolefins and styrene copolymers can be prepared without great expense by means of the thermoplastic coupling agent mixture according to the invention. The thermoplastic polymer mixtures obtainable therefrom exhibit, inter alia, a high mechanical strength, in particular a high flexural impact strength, and are particularly suitable for producing fibers, films and molded articles.

EXAMPLES

I Components used

The components $A_1$, $A_2$ and $A_3$ (thermoplastic coupling agent mixtures) were in each case prepared by melt compounding in a twin-screw extruder at 240° C. and an average residence time of the individual polymers of from 0.5 to 3.0 minutes.

Thermoplastic coupling agent mixture $A_1$

Obtained by melt compounding 2 kg of ethylene copolymer (containing 35% by weight of n-butyl acrylate, 5% by weight of acrylic acid; melt flow index: 10 ml/10 min, at 190° C. and 2.16 kg) and 3 kg of a styrene-butadiene block copolymer having a branched structure, a styrene content of 75% by weight and a viscosity number of 86 ml/g (measured in a 0.5% strength solution in toluene at 25° C.).

Thermoplastic coupling agent mixture $A_2$

Obtained by melt compounding 4 kg of ethylene copolymer (containing 35% by weight of n-butyl acrylate, 5% by weight of acrylic acid; melt flow index: 10 ml/min, at 190° C. and 2.16 kg) and 1 kg of a styrene-butadiene block copolymer having a branched structure, a styrene content of 75% by weight and a viscosity number of 86 ml/g (measured in a 0.5% strength solution in toluene at 25° C.).

Thermoplastic coupling agent mixture $A_3$

Obtained by melt compounding 4 kg of ethylene copolymer (containing 35% by weight of n-butyl acrylate, 5% by weight of acrylic acid, melt flow index 10 ml/min, at 190° C. and 2.16 kg) and 1 kg of a styrene-butadiene copolymer having a three-block structure, a styrene content of 77% by weight and a viscosity number of 99 ml/g (measured in a 0.5% strength solution in toluene at 25° C.).

Component $B_1$

Propylene homopolymer (Novolen® 1100H from BASF Aktiengesellschaft), having a melt volume index (MVI) of 2.5 at 230° C/2.16 kg (according to DIN 53 735) and a modulus of elasticity of 1400N/mm² (measured according to DIN 53 457).

Component $B_2$

Polypropylene regranulate obtained by comminuting molded articles of component $B_1$ that had been stored for 6 months in the open air; has a melt flow index of 3 g/10 min, at 230° C./2.16 kg, according to DIN 53 735.

Component $C_1$

ABS copolymer containing 43% by weight of a graft copolymer having a polybutadiene core (60% by weight) and a styrene/acrylonitrile sheath grafted thereon (40% by weight; weight ratio of styrene to acrylonitrile 75:25), and also 57% by weight of a styrene/acrylonitrile copolymer comprising 75% by weight of styrene and 25% by weight of acrylonitrile and having a melt flow index (MFI) of 8 g/10 min at 200° C./21.6 kg (according to DIN 53 735) and a modulus of elasticity of 1900N/mm² (measured according to DIN 53 457).

Component $C_2$

ABS regranulate obtained by comminuting molded parts produced from component $C_1$ that had been stored for 6 months in the open air; has a melt flow index (MFI) of 11 g/10 min at 200° C./21.6 kg (according to DIN 53 735).

Component $C_3$

ASA copolymer containing 42% by weight of a graft copolymer comprising 60% by weight of a grafting base of 98% by weight of n-butyl acrylate and 2% by weight of a polyfunctional monomer (dihydrodicyclopentadienyl acrylate) and 40% by weight of a mixture of a styrene and acrylonitrile in a weight ratio of 75/25, grafted thereon, and also 58% by weight of a styrene/acrylonitrile copolymer (weight ratio 75/25) having a melt flow index (MFI) of 8 g/10 min at 200° C./21.6 kg (according to DIN 53 735) and a modulus of elasticity of 2300N/mm² (measured according to DIN 53 457)..

Component $C_4$

ASA regranulate obtained by comminuting molded parts that had been subjected for at least 6 months to loads normally encountered in use, and having a melt flow index (MFI) of 10 g/10 min at 200° C./21.6 kg (according to DIN 53 735).

Component $D_1$

Polycarbonate based on Bisphenol A (Lexan 161 ®) from General Electric), having a modulus of elasticity of 2300N/mm² (measured according to DIN 53 457).

Component $D_2$

Polycarbonate/ABS blend (60% by weight of Lexan ® 161 from General Electric/40% by weight of ABS, component $C_1$), having a melt volume index (MVI) of 12 ml/10 min at 260° C./5 kg (according to DIN 53 735) and a modulus of elasticity of 2200N/mm² (measured according to DIN 53 457).

Component $D_3$

Polycarbonate/ASA blend (60% by weight of Lexan ® 161 from General Electric, 40% by weight of ASA, component $C_3$), having a melt volume index (MVI) of 12 ml/10 min at 260° C./5 kg (according to DIN 53 735) and a modulus of elasticity of 2300N/mm² (measured according to DIN 53 457).

II. Preparation of the thermoplastic molding materials

The constituents were mixed in a twin-screw extruder from Werner & Pfleiderer at a melt temperature of 240° to 270° C. The polymer granules of the components A, B, C and if appropriate D were metered into the feed opening of the extruder, and the melt was poured into a water bath and granulated. The dried granules were injection molded at 230° to 260° C. into roundels and small standard specimens.

The flexural impact strength $a_k$ was determined at 23° C. on notched small standard specimens according to DIN 53 453.

The penetration energy $W_s$ was measured at 23° C. according to DIN 53 443.

The composition of the molding materials and measurement results are shown in Tables 1 to 5.

TABLE 1

| Test | 1* | 2 | 3 | 4 | 5 | 6 | 7 |
|---|---|---|---|---|---|---|---|
| Compd. $A_1$ [% by wt.] | — | 2.5 | 5 | 10 | — | — | — |
| Compd. $A_2$ [% by wt.] | — | — | — | — | 2.5 | 5 | 10 |
| Compd. $B_1$ [% by wt.] | 60 | 58.5 | 57 | 54 | 58.5 | 57 | 54 |
| Compd. $C_1$ [% by wt.] | 40 | 39 | 38 | 36 | 39 | 38 | 36 |
| $a_k$ [KJ/m²] | 3 | 4.5 | 5.9 | 6.8 | 5.2 | 6.1 | 9.9 |
| $W_s$ [Nm] | 0.5 | 2 | 7.2 | 11 | 2.5 | 8 | 15 |

*: Comparative Example

TABLE 2

| Test | 8 | 9 | 10 | 11* | 12 | 13 | 14 |
|---|---|---|---|---|---|---|---|
| Compd. $A_3$ [% by wt.] | 2.5 | 5 | 10 | — | 2.5 | 5 | 10 |
| Compd. $B_1$ [% by wt.] | 58.5 | 57 | 54 | 35 | 34 | 33 | 31.5 |
| Compd. $C_1$ [% by wt.] | 39 | 38 | 36 | 65 | 63.5 | 62 | 58.5 |
| $a_k$ [KJ/m²] | 4.8 | 6.2 | 8.7 | 4 | 7.3 | 9.4 | 11.9 |
| $W_s$ [Nm] | 2 | 7 | 13.7 | 1.5 | 8.2 | 12.5 | 17 |

*: Comparative Example

As the results of tests 1 to 14 show, the notched impact strength $a_k$ and penetration energy $W_s$ of blends of polypropylene and ABS are significantly improved by the addition of the coupling agent mixture according to the invention.

TABLE 3

| Test | 15* | 16 | 17 | 18 | 19 |
|---|---|---|---|---|---|
| Compd. $A_2$ [% by wt.) | — | 2.5 | 5 | — | — |
| Compd. $A_3$ [% by wt.] | — | — | — | 2.5 | 5 |
| Compd. $B_1$ [% by wt.] | 60 | 58.5 | 57 | 58.5 | 57 |
| Compd. $C_3$ [% by wt.] | 40 | 39 | 38 | 39 | 38 |
| $a_k$ [KJ/m²] | 2.7 | 4.1 | 5.3 | 4.0 | 5.6 |
| $W_s$ [Nm] | 0.1 | 3 | 6.9 | 2.9 | 6.6 |

*: Comparative Example

In the case of polypropylene/ASA blends too, the coupling agent mixture results in improvements in the properties.

TABLE 4

| Test | 20* | 21 | 22* | 23 | 24* | 25 |
|---|---|---|---|---|---|---|
| Compd. $A_2$ [% by wt.] | — | 5 | — | 5 | — | 5 |
| Compd. $B_1$ [% by wt.] | 60 | 57 | 60 | 57 | 60 | 57 |
| Compd. $C_1$ [% by wt.] | 30 | 28.5 | 30 | 28.5 | 30 | 28.5 |
| Compd. $D_1$ [% by wt.] | 10 | 9.5 | — | — | — | — |
| Compd. $D_2$ [% by wt.] | — | — | 10 | 9.5 | — | — |
| Compd. $D_3$ [% by wt.] | — | — | — | — | 10 | 9.5 |
| $a_k$ [KJ/m²] | 2.5 | 5.7 | 2.8 | 6.0 | 2.7 | 4.8 |
| $W_s$ [Nm] | 0.1 | 6.3 | 0.1 | 6.7 | 0.1 | 6.2 |

*: Comparative Example

The results of tests 20 to 25 clearly show that the coupling agent mixture results in an improvement in toughness even in blends containing further thermoplastics in addition to polypropylene and ABS.

TABLE 5

| Test | 26 | 27 | 28 | 29* | 30 | 31* | 32 |
|---|---|---|---|---|---|---|---|
| Compd. $A_2$ [% by wt.) | 5 | 5 | 5 | — | 5 | — | 5 |
| Compd. $B_1$ [% by wt.] | 30 | 57 | 57 | — | — | — | — |
| Compd. $B_2$ [% by wt.] | 27 | — | — | 60 | 57 | 60 | 57 |
| Compd. $C_1$ [% by wt.] | 38 | — | — | — | — | — | — |
| Compd. $C_2$ [% by wt.] | — | 38 | — | 40 | 38 | — | — |
| Compd. $C_4$ [% by wt.] | — | — | 38 | — | — | 40 | 38 |
| $a_k$ [KJ/m$^2$] | 5.4 | 5.5 | 4.9 | 2.8 | 4.9 | 2.2 | 4.3 |
| $W_s$ [nM] | 6.5 | 6.4 | 6.7 | 0.1 | 6.3 | 0.1 | 5.9 |

*: Comparative Example

In blends prepared using regranulated material, the coupling agent mixture likewise results in a marked improvement in toughness.

We claim:

1. A thermoplastic coupling agent mixture (A), containing
   a) 5 to 95% by weight of an ethylene copolymer ($A_I$) having minor amounts of polar comonomers, and
   b) 5 to 95% by weight of a copolymer ($A_{II}$) of aromatic monovinyl comonomers and conjugated dienes having a star-structure obtained by a multiple initiation process wherein the proportion of aromatic monovinyl comonomers is between 25-90% by weight of the copolymer $A_{II}$.

2. A thermoplastic coupling agent mixture (A) as claimed in claim 1, wherein the polar comonomers of the ethylene copolymer ($A_I$) used are $\alpha, \beta$-unsaturated carboxylic acids or carboxylic acid derivatives.

3. A thermoplastic coupling agent mixture (A) as claimed in claim 1, wherein the aromatic monovinyl comonomer of the copolymer ($A_{II}$) used is styrene.

4. A thermoplastic coupling agent mixture (A) as claimed in claim 1, wherein the conjugated diene used in the copolymer ($A_{II}$) is butadiene.

5. A thermoplastic coupling agent mixture (A) as claimed in claim 1, wherein copolymers ($A_{II}$) are used that can be obtained by first of all polymerizing aromatic monovinyl comonomers with conjugated dienes and then subjecting the product to a hydrogenation reaction.

6. A process for preparing the thermoplastic coupling agent mixture (A) as clawed in claim 1, wherein the components ($A_I$) and ($A_{II}$) are mixed in a suitable mixing apparatus at average residence times of the components of from 0.2 to 30 minutes and at from 220° to 290° C.

* * * * *